Aug. 21, 1928.
C. C. FARMER
1,681,580
ANGLE COCK DEVICE
Filed April 20, 1927
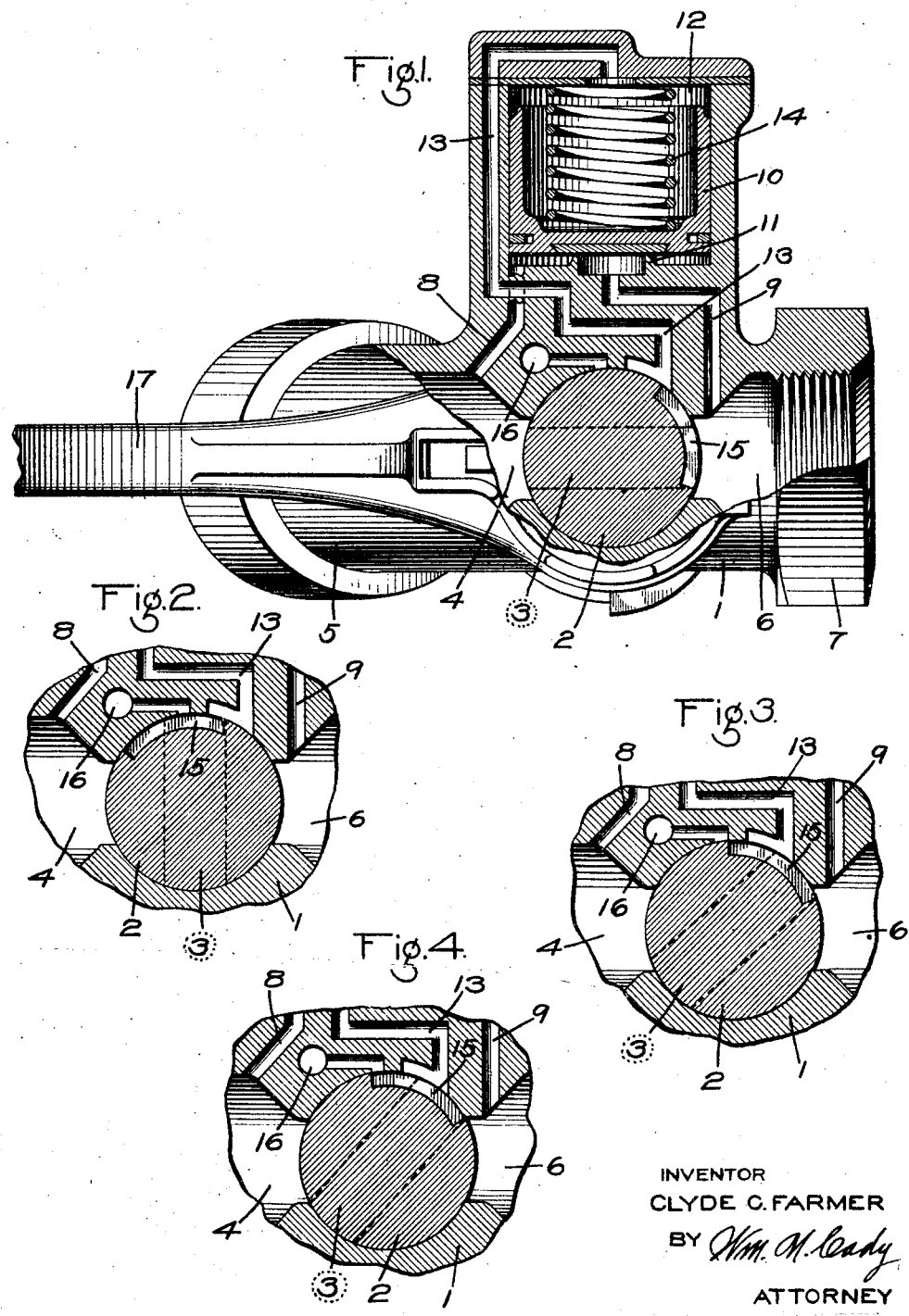
INVENTOR
CLYDE C. FARMER
BY *Wm. M. Cady*
ATTORNEY Patented Aug. 21, 1928.

1,681,580

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

ANGLE-COCK DEVICE.

Application filed April 20, 1927. Serial No. 185,187.

This invention relates to angle cocks of the type employed in railway fluid pressure brake systems.

If an angle cock of the usual type be closed at any point in the train, either accidentally or maliciously, the brakes at the rear of the closed angle cock cannot be controlled by the engineman.

The principal object of my invention is to provide an improved angle cock having means for obviating the above difficulty and ensuring that the brakes may be controlled throughout the train, even if an angle cock should become closed.

In the accompanying drawing, Fig. 1 is a plan view, partly in section, of an angle cock embodying my invention; and Figs. 2, 3, and 4, views illustrating different positions of the plug valve of the angle cock.

The angle cock may comprise a cock body 1, containing a plug valve 2 having the usual port 3 adapted in the open position of the valve to connect the conduit 4 of the angle end 5 of the angle cock with the conduit 6 of the brake pipe end 7.

Disposed in the cock body is a by-pass passage 8, leading from conduit 4, and a by-pass passage 9, leading from the conduit 6. A valve piston 10 is provided for controlling communication between the passages 8 and 9 and in its seated position, the piston 10 is subject on the seated area within the seat ring 11 to the pressure of fluid as supplied from the conduit 6 through passage 9, while the outer seated area is open to the conduit 4 through passage 8.

The chamber 12 at the outer side of the valve piston is connected to a passage 13, which leads to the seat of the plug valve 2 and contained in said chamber is a coil spring 14 which acts on the valve piston 10.

The plug valve 2 is provided with a cavity 15 which is adapted to connect passage 13 with an atmosphere exhaust port 16 in all positions of the plug valve in which communication from conduit 6 through port 3 with conduit 4 is closed.

When cars are coupled together and the angle cock is in its open position, with port 3 connecting the conduits 4 and 6, the brake pipe may be charged with fluid under pressure in the usual manner. Cavity 15 in this position does not register with exhaust port 16, but connects conduit 6 with passage 13. Consequently, fluid under pressure is supplied from conduit 6 to chamber 12, and since the under side of the valve piston is subject to the same fluid pressure as supplied through passages 9 and 8, the spring 14 holds the valve piston 10 seated.

If an angle cock should become closed, either by accident or design, the cavity 15 will connect passage 13 to exhaust port 16, and fluid under pressure in chamber 12 will be vented to the atmosphere, with the result that the fluid pressure acting on the under side of the valve piston will operate to shift the valve piston upwardly, so that communication is opened from conduit 6 through passage 9 and passage 8 to conduit 4. A by-pass communication around the closed angle cock being thus automatically established by the movement of the angle cock to the closed position, it will be seen that fluid under pressure is free to flow in either direction through the angle cock, so that the brakes may be controlled throughout the train in the same manner, as though an angle cock had not been closed.

When it is desired to connect a car which does not have its brake system charged with fluid under pressure to a train which is charged with fluid under pressure, the angle cock handle on the end of the train is turned so as to permit fluid under pressure to flow through the hose connections to the uncharged car at a sufficiently low rate to prevent an emergency application of the brakes on the train, the angle cock on the uncharged car being in open position. In such a position, fluid will also flow from conduit 4 through cavity 15 and passage 13 to chamber 12, and although fluid under pressure is also supplied through passage 8 to the area within the seat ring 11, the piston 10 will be held seated, due to the larger area of the piston which is exposed to fluid pressure in chamber 12.

It will thus be evident that when an uncharged car is connected to a train, the by-pass around the plug valve will not be opened during the time that the car is being charged with fluid under pressure from the train.

There is no pressure in the hose at the end of the last car of a train, so that the outer seated area of the valve piston 10 is at atmospheric presssure, and the spring 14 has sufficient force to hold the valve piston seated against the brake pipe pressure acting through passage 9 on the seated area within the seat ring 11. Consequently, air will not escape from the angle cock at the rear end of the train by way of the by-pass passages.

Having now described my invention, what I claim as new and desire to secure by Letters Patent, is:—

1. The combination with an angle cock having a brake pipe controlling valve, of valve means for controlling a by-pass passage around said valve, said valve means having one side subject to brake pipe pressure and having the other side connected to the atmosphere in a closed position of the valve.

2. The combination with an angle cock having a brake pipe controlling valve, of valve means for controlling a by-pass passage around said valve, said valve means having one side subject to brake pipe pressure and having the other side connected to the atmosphere by the movement of said valve to a position closing communication through the brake pipe.

3. The combination with a brake pipe controlling valve, of valve means subject on one side to brake pipe pressure for controlling a by-pass for establishing communication around said valve and means controlled by said valve for connecting the opposite side of said valve means to the atmosphere.

4. The combination with a brake pipe controlling valve, of a valve for controlling a by-pass from one side of the controlling valve to the other side, a piston for operating said by-pass valve, subject on one side to brake pipe pressure, and means controlled by said controlling valve for venting fluid from the other side of said piston.

5. The combination with a brake pipe controlling valve, of a valve for controlling a by-pass from one side of the controlling valve to the other side, a piston for operating said by-pass valve, subject on one side to brake pipe pressure, and means controlled by said controlling valve for supplying fluid to and venting fluid from the opposite side of said piston.

6. The combination with a brake pipe controlling valve, of a valve for controlling a by-pass from one side of the controlling valve to the other side, a piston for operating said by-pass valve, subject on one side to brake pipe pressure, said controlling valve being adapted to vent fluid under pressure from the opposite side of said piston when the controlling valve is in a position cutting off communication through the brake pipe and to supply fluid under pressure thereto when the controlling valve is in a position establishing communication through the brake pipe.

In testimony whereof I have hereunto set my hand.

CLYDE C. FARMER.